United States Patent Office 2,740,724
Patented Apr. 3, 1956

2,740,724

ALLYL STARCH EMULSION AND A PROCESS OF PREPARING IT

Arthur N. Wrigley, Philadelphia, and Joseph H. Schwartz, Willow Grove, Pa., assignors to the United States of America as represented by the Secretary of Agriculture No Drawing. Application May 9, 1952,
Serial No. 287,027

6 Claims. (Cl. 106—213)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to aqueous emulsions containing allyl starch, and to methods of producing them.

Allyl starch is commercially produced as a moist, solid material containing about 20 to 40 percent water. For application, particularly as a coating or impregnating material, it is commonly dissolved in a suitable volatile organic solvent. This procedure involves additional expense for solvent and for solvent-recovery equipment and also introduces health and fire hazards because of the presence of organic vapors.

The disadvantages of applying a coating or impregnating material in a volatile organic solvent can be eliminated if the material can be applied satisfactorily in the form of an aqueous emulsion. Many solid materials, including allyl starch, are difficult to emulsify, and the emulsions, if produced at all, tend to be unstable and to separate into two distinct layers.

Attempts to prepare allyl starch emulsions by the conventional process of grinding or milling the solid in the presence of water containing an emulsifying, wetting, or dispersing agent result in the formation of emulsions only after many hours of treatment. Furthermore, the emulsions so obtained are unstable and the allyl starch soon separates from the aqueous phase and settles out as a solid phase.

We have discovered that satisfactory, stable, useful emulsions can be prepared from solutions of allyl starch in volatile organic solvents. Such emulsions are preferred over the simple solutions in volatile organic solvents because the proportion of solvent required is much less and the viscosity of a high-solids preparation is lower. However, these emulsified solutions of allyl starch still retain in considerable degree the disadvantages of solutions in volatile organic solvents named above. For this reason it was desired to eliminate altogether the use of volatile organic solvents in allyl starch emulsions.

We have further discovered that by use of a suitable plasticizer, emulsifying agent, pH, temperature and water content, and by following a specific procedure in the mixing and blending process, stable emulsions of allyl starch can be prepared which are free of volatile organic solvent and from which clear, smooth, continuous, glossy films may be prepared.

In the preparation of these emulsions, illustrated in the examples described below, the only satisfactory emulsifying agents we have found are deca(oxyethylene) glycol mono-p-(1,1,3,3-tetramethylbutyl) phenyl ether (sold commercially as Triton X-100) and eicosa (oxyethylene) sorbitan monolaurate (sold commercially as Tween 20). All of the many other conventional emulsifying agents tried were useless for our purposes, either because emulsions could not be formed with them or because the emulsions formed were not sufficiently stable to give the product a reasonable shelf-life. The stability of the emulsions, especially those made with little or no plasticizer, was notably improved by the addition of sodium tetrahydronaphthalene sulfonate (a dispersing agent sold commercially as Alkanol S). Other conventional dispersing and stabilizing agents were useless or less effective.

The preferred pH range is 8 to 11 and is attained suitably by addition of the proper amount of ammonia or other base. The base, in addition to establishing the desired pH, seems to act as a dispersing agent and aids in the formation of a stable emulsion.

Since most applications for allyl starch require the presence of a plasticizer, and since we have found that incorporation of a plasticizer into the moist allyl starch before making the emulsion enormously facilitates the formation of a stable emulsion, particularly in the absence of a volatile solvent, we prefer to blend a suitable plasticizer with moist allyl starch and then add water to make the finished emulsion. Thus, in our preferred process we blend the moist allyl starch, containing about 30 percent water, with the plasticizer by kneading, milling or stirring at an elevated temperature in the range 80 to 100° C. The emulsifying agent and the volatile base are then added and agitation is continued until a uniform water-in-oil emulsion is formed. The temperature then is allowed to drop to the range 25–60° and water is added slowly, with agitation, until the viscous water-in-oil emulsion inverts to form a much less viscous oil-in-water emulsion. The latter can then be diluted to any desired extent by addition of more water. The exact temperature best suited to the addition of the water will vary from 25° to 60°, depending on the viscosity of the allyl starch-plasticizer blend, the more viscous materials requiring the higher temperature.

We have found that many conventional plasticizers, although compatible with allyl starch, cannot be used in preparing our emulsions because the emulsions, if formed, are not sufficiently stable for practical use. Of the many conventional plasticizers tested, only tetrabutyl thiodisuccinate (sold commercially as Flexol TWS) and trichlorobiphenyl (sold commercially as Aroclor 1242) are entirely satisfactory.

The water content of the finished emulsion may be varied over a wide range, since such emulsions are usually capable of great dilution. But the minimum amount of water necessary for stability is more critical and varies somewhat with the character of the allyl starch used. Since allyl starches can be made of different degrees of substitution and varying molecular weights, the minimum amount of total water needed for 100 parts of dry-basis allyl starch plus plasticizer ranges from 80 to 200 parts.

The following examples illustrate the invention:

Table I.—Recipes

| Example Number | 1 | 2 | 3 | 4 | 5 | 6 | 7 | 8 |
|---|---|---|---|---|---|---|---|---|
| Allyl Starch, g | 80 | 80 | 85 | 90 | 100 | 80 | 85 | 85 |
| Flexol TWS,[a] g | 20 | 20 | 15 | 10 | | | | |
| Aroclor 1242,[b] g | | | | | | 20 | 15 | 15 |
| Triton X-100,[c] g | 5 | 5 | 5 | 5 | 10 | 5 | 5 | |
| Tween 20,[d] g | | | | | | | | 10 |
| NH$_4$OH, conc. ml | 3 | 2 | 2 | 2 | 2 | 2 | 2 | 1 |
| Alkanol S,[e] g | | 1 | 1 | | | 1 | 1 | |
| Water, total, g | 170 | 170 | 170 | 170 | 170 | 170 | 200 | 100 |
| Temperature of water addition [b] C | 40 | 40 | 40 | 40 | 60 | 40 | 40 | 60 |
| Particle size, microns | 1 | 1 | 1 | 1 | 1 | 1 | 1 | 1 |
| Viscosity, centipoises | 36 | 29 | 102 | 41 | 26 | 46 | 156 | 358 |

[a] Commercial trade name for tetrabutyl thiodisuccinate.
[b] Commercial trade name for trichlorobiphenyl.
[c] Commercial trade name for deca (oxyethylene) glycol mono-p-(1,1,3,3-tetramethylbutyl) phenyl ether.
[d] Commercial trade name for eicosa (oxyethylene) sorbitan monolaurate.
[e] Commercial trade name for sodium tetrahydronaphthalene sulfonate.

Example 1

Eighty grams of allyl starch on a dry basis (111 g. of allyl starch solids containing 28% moisture) were ground with a mortar and pestle and charged into a 500 ml., 3-necked flask equipped with mechanically driven wire stirrer and reflux condenser. Twenty grams of Flexol TWS were added as plasticizer with the stirrer going. The flask and its contents were now brought to 90° C. by immersion in a bath of oil maintained at that temperature. The allyl starch and plasticizer were blended for one hour at 90°. Then 5 grams of Triton X-100 emulsifying agent and 3 ml. of 59 percent ammonium hydroxide were added and mixed with the original ingredients for 15 minutes, whereby a viscous water-in-oil emulsion was formed.

The flask and its contents were then cooled to 40° C. by placing in a bath controlled at 40° C. Water was then gradually added until a total of 170 grams of water were present. Since the original 111 grams of moist allyl starch contained 31 grams of water, it was necessary to add only 139 more grams of water to have a total of 170 grams. During the water addition, the emulsion inverted from a viscous water-in-oil type to a fluid oil-in-water type. When the addition of water was complete, the emulsion was allowed to cool down slowly to room temperature. The finished emulsion had a fine particle size of 1 micron or less, was stable for over 2 months, and had a viscosity of 36 centipoises. Films of this emulsion cast by pouring onto a glass plate dried clear in 10 minutes and dried to the touch in 13 minutes.

Example 2

The same quantities were used as in Example 1 except for 2 changes: 2 ml. of concentrated ammonia were used instead of 3, and 1 gram of Alkanol S dispersing agent was added to the blend at the time of adding the ammonia. An emulsion of similar properties was produced, which gave clear air-dried films.

Examples 3, 4, 6, 7, 8

Table I indicated the quantities of materials taken for these examples. In each case the moist allyl starch was first blended with a plasticizer for 1 hour at 90° C. Then an emulsifying agent or agents were added and blended in for 15 minutes to form a water-in-oil emulsion. Finally, at a temperature indicated on the chart, additional water (in amount sufficient to give the totals shown) was gradually added to the stirred emulsion, with the production of a final oil-in-water type of emulsion. Clear air-dried films were obtainable from all these emulsions.

Example 5

In this case no plasticizer was used. The 100 g. of dry-basis allyl starch (139 g. of 28% moist allyl starch) was blended for 1 hour at 90° C. with 10 g. of Triton X-100 emulsifying agent and 2 ml. of 59 percent ammonium hydroxide. Then the containing flask was transferred to 60° C. bath. With continued stirring water was then gradually added until 170 g. of water were present (131 ml. additional water added). Films cast from this emulsion and allowed to dry at room temperature were only slightly less clear than those of emulsions containing plasticizer.

We claim:

1. An aqueous emulsion of allyl starch containing deca(oxyethylene) glycol mono-p-(1,1,3,3-tetramethylbutyl) phenyl ether as an emulsifier.

2. The emulsion of claim 1 containing tetrabutyl thiodisuccinate as a plasticizer.

3. The emulsion of claim 2 containing sodium tetrahydronaphthalene sulfonate as a dispersing agent.

4. The process of preparing an aqueous emulsion of plasticized allyl starch comprising intimately mixing at 80 to 100° C. one hundred parts of allyl starch (dry basis), 20 to 70 parts of water, 9 to 25 parts of tetrabutyl thiodisuccinate as a plasticizer, and 1 to 10 parts of deca(oxyethylene) glycol mono-p-(1,1,3,3-tetramethylbutyl) phenyl ether as an emulsifier to form a water-in-oil emulsion; then cooling said emulsion to 25 to 60° C. and adding water thereto, with agitation, until an inversion occurs to produce an oil-in-water emulsion and further until a total of at least 80 parts of water are present.

5. The process of preparing an aqueous emulsion of plasticized allyl starch comprising intimately mixing at 80 to 100° C. one hundred parts of allyl starch (dry basis), 20 to 70 parts of water, 5 to 25 parts of tetrabutyl thiodisuccinate as a plasticizer, and 1 to 10 parts of an emulsifier selected from the group consisting of deca(oxyethylene) glycol mono-p-(1,1,3,3-tetramethylbutyl) phenyl ether and eicosa(oxyethylene) sorbitan monolaurate to form a water-in-oil emulsion; then cooling said emulsion to 25 to 60° C. and adding water thereto, with agitation, until an inversion occurs to produce an oil-in-water emulsion and further until a total of at least 80 parts of water are present.

6. The process of preparing an aqueous emulsion of plasticized allyl starch comprising intimately mixing at 80 to 100° C. one hundred parts of allyl starch (dry basis), 20 to 70 parts of water, 5 to 25 parts of a plasticizer, and 1 to 40 parts of deca(oxyethylene) glycol mono-p-(1,1,3,3-tetramethylbutyl) phenyl ether as an emulsifier to form a water-in-oil emulsion, then cooling said emulsion to 25 to 60° C. and adding water thereto, with agitation, until an inversion occurs to produce an oil-in-water emulsion and further until a total of at least 80 parts of water are present.

References Cited in the file of this patent

UNITED STATES PATENTS

| | | |
|---|---|---|
| 1,970,572 | Murray | Aug. 21, 1934 |
| 2,413,463 | Nichols | Dec. 31, 1946 |

OTHER REFERENCES

"American Ink Maker," May 1950, pp. 27–29, 59, 61 and 63.

"Plasticizers and Resins," Monsanto Chemical Co., St. Louis, Mo. (1940), pp. 32–35, 38 and 39.